United States Patent [19]

Yagi et al.

[11] 3,875,582

[45] Apr. 1, 1975

[54] FILM SCANNER

[75] Inventors: Motoi Yagi, Zushi; Yutaka Ikusawa, Tokyo, both of Japan

[73] Assignee: Tokyo Shibaura Electric Co., Ltd., Kawasaki-shi, Japan

[22] Filed: May 16, 1973

[21] Appl. No.: 360,892

[30] Foreign Application Priority Data

May 19, 1972 Japan ................................ 47-49664
May 22, 1972 Japan ................................ 47-50579

[52] U.S. Cl. ................................ 358/8, 178/DIG. 28
[51] Int. Cl. ........................... H04n 9/00, H04n 5/36
[58] Field of Search.... 178/5.2 D, 5.4 CD, DIG. 28, 178/7.1, 7.2; 358/6, 7, 8, 54

[56] References Cited

UNITED STATES PATENTS

| | | | |
|---|---|---|---|
| 2,818,466 | 12/1957 | Larson | 178/DIG. 28 |
| 3,378,635 | 4/1968 | Goldmark et al. | 178/DIG. 28 |
| 3,410,954 | 11/1968 | Erde | 178/DIG. 28 |
| 3,535,992 | 10/1970 | Goldmark et al. | 178/5.2 D |
| 3,585,293 | 6/1971 | Crowder | 178/DIG. 28 |
| 3,655,908 | 4/1972 | Goldberg et al. | 178/5.4 CD |
| 3,716,655 | 2/1973 | Iwamura et al. | 178/5.4 CD |

*Primary Examiner*—Robert L. Richardson
*Attorney, Agent, or Firm*—Oblon, Fisher, Spivak, McClelland & Maier

[57] ABSTRACT

An apparatus for reproducing a still picture includes a flying spot scanner having its vertical deflection device for scanning a video film which has a plurality of luminance signal recorded frames and frames on which color signals are recorded together with pilot signals. Each frame is separated from another by a frame margin. A control device is provided for obtaining automatic coincidence of the position of a raster formed by the scanning with that of a frame. The control device comprises a frame margin signal detector for obtaining a frame margin signal from a still picture signal obtained by the scanning, by detecting the lack of the pilot signal recorded on the frame margin and further comprises a control circuit for controlling the vertical deflection device according to the frame margin signal so that the position of the raster may coincide with that of the frame by displacing vertically the position of the raster.

5 Claims, 7 Drawing Figures

FILM SCANNER

The present invention relates to a control device of still picture reproduction, particularly to a control device of still picture reproduction for obtaining one frame of still picture without frame marginal portion from a video film recorded by an electronic video recording system (EVR).

The video film recorded by EVR system comprises, for instance, a row of frames A having recorded a luminance signal and a row of frames B having recorded a color signal respectively arranged longitudinally of the video film interposed with frame marginal portion therebetween, the frames A and B corresponding to each other being disposed in the lateral direction of the film.

In such a case that still picture reproduction is obtained from a video film recording, said film is scanned by a spot light from a flying spot scanner tube, for example, and the transmitted or reflected light by the film is photoelectrically converted. In this case, for the frame marginal portion not to appear in a reproduced still picture, the position of a frame, having recorded a picture signal, of the film must be coincident with that of raster of the flying spot scanner tube.

In the event that a mechanical frame feed mechanism is adopted for accomplishing such purpose, the operation becomes so complicated as to be given up. To remove this difficulty, it has long since been contemplated to provide a detection element (for instance, a phototransistor) for optically detecting the position of a frame margin by use of a synchronizing window furnished between frames or a magnetic or mechanical means for detecting the position of a frame margin, and with the aid of a detection signal from such detection element or means, the position of a film is automatically adjusted and one whole frame is hereby scanned completely. However, the position of the detection element shifts or the film expands or contracts due to the variation of temperature, thereby causing changes of the position of the frame margin. Furthermore, in case only one of the detection elements is employed, it is difficult to continuously detect the positions of frame margins and, consequently, a large number of detection elements are required for such case, the film controlling device becoming thereby very complicated. Also in case of utilizing a synchronizing window, the detection element must be closely contacted with the film and there arises a possibility of damaging the film. Moreover, the above means moves the film itself and, consequently, the moving mechanism must possess a high mechanical accuracy but there is an accompanied drawback that the response velocity to detection is too slow which is difficult to eliminate.

Accordingly, the object of the present invention is to provide a control device of still picture reproduction, utilizing a pilot signal contained in still picutre reproduction signals obtained by scanning a film having a picture signal including a pilot signal recorded for adjusting vertically the position of the raster resulting from the above-mentioned scanning so as to coincide with that of a frame of the film.

The present invention comprises a device for obtaining still picture reproduction signal by scanning with spot light a recorded video film where a plurality of frames having picture signals and pilot signals recorded are arranged at a predetermined pitch by way of frame margin and thereafter photoelectrically converting the transmitted or reflected light by the film;

a frame margin detector for taking out a frame margin signal corresponding to said frame margin by detecting the pilot signal in the still picture reproduction signal; and a control device for controlling a vertical deflection device for scanning corresponding to the frame signals so that the position of raster obtained by scanning the spot light may coincide with that of a frame of the film.

According to the present invention, a control circuit of the vertical deflection device may comprise the following means, namely, a means for comparing the phase of the frame margin signal with the phase of the vertical synchronizing signal applied to the vertical deflection device and obtaining a control signal for the vertical device having amplitude corresponding to the difference between the phases, a means for holding the amplitude of the control signal, a means for supplying the control signal of the held amplitude to the vertical deflection device, and a means for maintaining constant the relationship between the phase difference of the frame margin signal with respect to the vertical synchronizing signal and the amplitude of the control signal by the control signal of the held amplitude so that the position of the raster may be changed to be coincident with that of the frame.

According to the present invention, the position of the raster can be detected by use of pilot signal, thereby accomplishing desired objects such as high accuracy, high response, and high probability without any damage to the film. Since this control device is operated purely electrically, it has a great advantage over control devices where mechanical control device is employed or those where a mechanical control device employing a servo-loop in used.

The present invention can be more fully understood from the following detailed description when taken in connection with reference to the accompanying drawings, in which.

Figure 1:
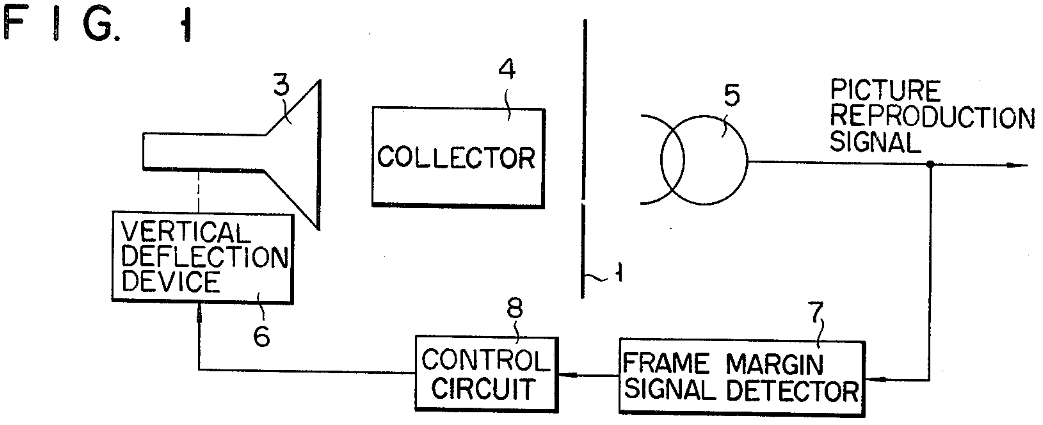
FIG. 1 is a schematic view showing an arrangement of elements of an embodiment of the present invention.
Figure 2:
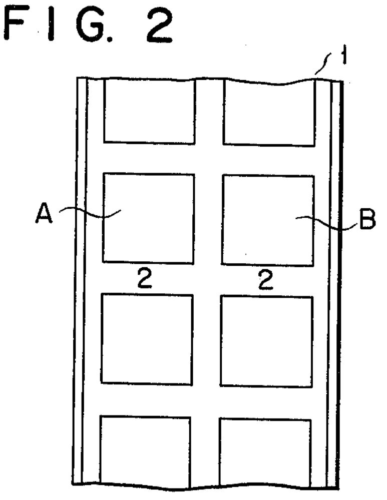
FIG. 2 is a schematic view showing an example of film having picture signals recorded by EVR system.

Referring to FIG. 1, a video tape 1 is provided, as shown in FIG. 2, with a plurality of frames A arranged in the longitudinal direction of the tape by way of frame margin portions 2 and a plurality of frames B arranged in the longitudinal direction of the film by way of frame margin portions 2, in parallel to each other. In the frame A are recorded luminance signals and in the frame B corresponding laterally to the frame A recorded color signals corresponding to the luminance signals of the frame A. The film recorded by EVR system of NTSC system generally contains a pilot signal in the color signals recorded in the frame B, for instance, a pilot signal of 0.9 MHz.

The film 1 is at still state and a pair of frames A and B arranged laterally is scanned by the spot light from a flying spot scanner tube 3 through a collector 4, and the light transmitted through the film 1 (the reflected light may be utilized) is photoelectrically converted by a photomultiplier 5. The picture reproduction signal obtained by the photomultiplier is supplied to an unshown picture reproduction device, for instance, a television picture tube, and a still picture is thereby obtained. The flying spot scanner tube is provided with an unshown horizontal deflection device and a vertical deflection device 6 so that a raster by spot light scanning is formed. The height of the raster is a little greater than that of the frame A or B. In general, the vertical position of the raster does not coincide with that of the frame. Therefore the reproduced picture signal contains a frame margin signal which is produced when the spot light scans a frame margin portion 2 between two adjacent frames B, since the pilot signal is not recorded on the frame margine portion. Part of the picture reproduction signal is supplied to a frame margin signal detection circuit 7, and the output of the frame margin signal detection circuit is supplied to a control circuit 8 controlling the vertical deflection device 6. The control circuit 8 detects a phase difference between a vertical synchronizing pulse *a* and a corresponding frame margin signal e and produces a control signal *h* and/or *i*. The control signal is a DC voltage the amplitude of which corresponds to the phase difference. The DC voltage is supplied as a DC bias voltage to the vertical deflection device 6 for displacing vertically the position of the raster. In case the vertical position of the raster of the flying spot scanner tube does not coincide with that of the frame of the film 1, the raster is displaced vertically so that the two vertical position may coincide.

Figure 3:
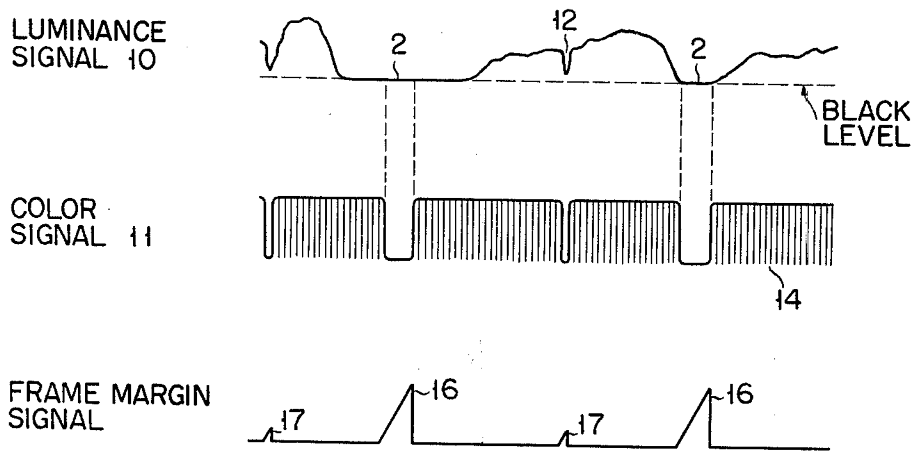
FIG. 3 is a waveform diagram showing the relationship between luminance signal, color signal, and frame margin signal obtained by optical scanning of the tape shown in FIG. 2 and the subsequent photoelectric conversion means.
Figure 4:
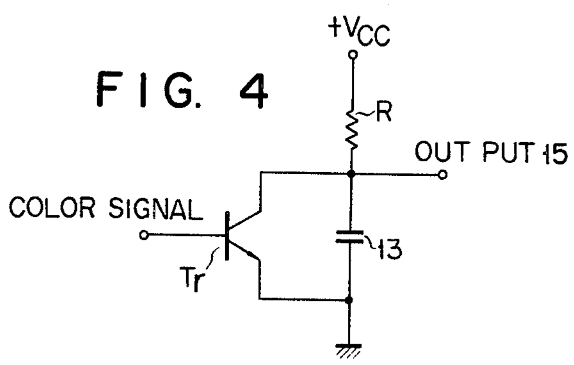
FIG. 4 shows an embodiment of a detection circuit of the frame margin signal indicated in FIG. 1.

The picture reproduction signals obtained by scanning the frames A and B include luminance signals 10 and color signals 11 as shown in FIG. 3. The color signal 11 contains pilot signals for instance, of 0.9 MHz as described before. The luminance signal is always at zero-level (black level) at the frame margin portion 2, but the position of the frame margin portion 2 cannot be detected occasionally depending upon the luminance signal amplitude. However, in the color signal 11, the aforesaid pilot signal always reaches zero-level only at the position of the frame margin portion 2. Each signal also comes to zero-level at flyback periods 12. Such color signals 11 are apllied in a frame margin signal detection circuit 7 as shown in FIG. 4, thereby enabling the position of frame margin signals to be detected. The detection circuit 7 contains a condenser 13 having a D.C. voltage Vcc applied across a resistance R and a transistor Tr connected in parallel thereto, and said color signal 11 is applied to the base of the transistor Tr. The color signal 11 always has a pilot signal component higher than a certain level 14 except the frame margin portion 2 and a vertical flyback period 9. Accordingly, in case the transistor Tr is so arranged as to conduct when a voltage applied to the base is higher than the level 14 and not to conduct when lower than the level 14, the condenser 13 discharges when the transistor conducts and is charged when the transistor does not conduct. The output 15 shown in FIG. 4 can thus be taken out. The output 15, as shown in FIG. 3, includes a signal 16 corresponding to the frame margin portion as well as a signal 17 corresponding to the vertical flyback period 12, but the level of the signal 17 is very low as compared with that of the signal 16. Consequently, only saw tooth waveform signal 16 can be taken out by passing the output 15 through a proper limiter.

The phosphor screen of the flying spot scanner tube 3 has a vertical length usually to two frames, and the vertical length of the raster is equal to one frame when scanning. The position of the raster can accordingly be changed vertically by controlling the vertical deflection device 6. An embodiment of the block diagram of the control device 8 indicated in FIG. 1 is shown in FIG. 5 and the waveform diagrams for explaining the operation of the circuit of FIG. 5 are shown in FIGS. 6 and 7.

Figure 5:
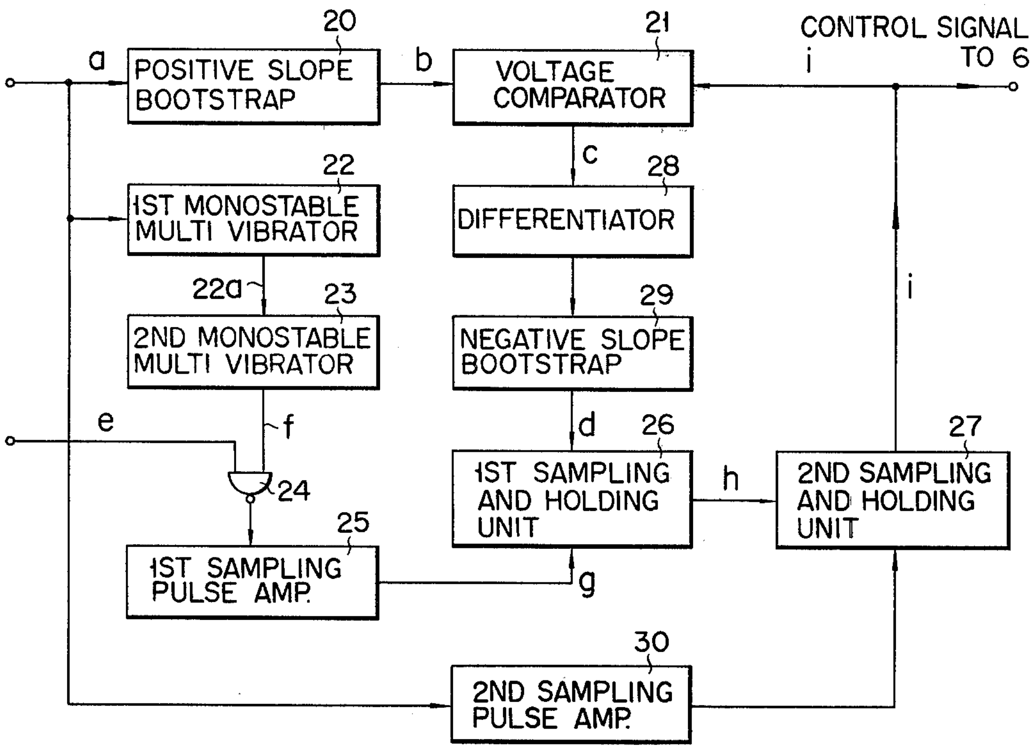
FIG. 5 is a block diagram showing an embodiment of the control device of the vertical deflection device indicated in FIG. 1.
Figure 6:
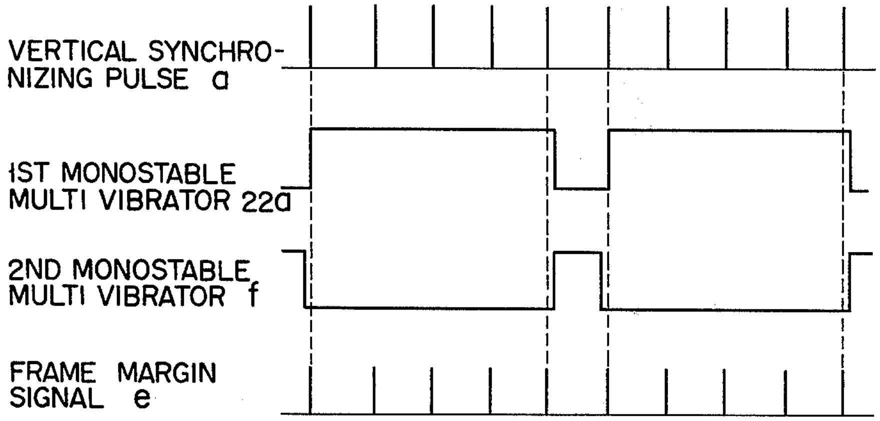
FIG. 6 is a waveform diagram for explaining the operation of a gate circuit shown in FIG. 5.

In case a vertical synchronizing pulse *a* applied to the vertical deflection device 6 shown in FIG. 5 is placed on a positive slope bootstrap circuit 20, a saw tooth-form wave *b* is generated from this circuit rising at the time of generation of the synchronizing pulse *a* and this saw tooth-form wave is compared with a control signal *i* later described in a voltage comparator 21. A gate means is provided for sampling the frame margin signal in case the aforesaid frame margin signal 16 (represented by *e* in FIG. 7 and hereafter represented by *e*) and said vertical synchronizing pulse *a* do not coincide, that is, the position of the raster does not coincide with that of the frame. This gate means includes a first monostable multivibrator 22 driven by the vertical synchronizing pulse *a*, a second monostable multivibrator 23 (output *f*) driven by said monostable multivibrator, and an AND gate 24 taking as one input the output *f* of the second monostable multivibrator 23 and as the other input the frame margin signal *e*. The gate means is so arranged as to take out one frame margin signal *e* in a period *n* times the period of the vertical synchronizing pulse after a phase difference occurs between the vertical synchronizing pulse *a* and the frame margin signal *e* ($n$=5 in this embodiment). Accordingly, the widths of the outputs of the first and second monostable multivibrators, 22*a* and *f*, are determined as shown in FIG. 6 in a state that the phases of the synchronizing pulse *a* and the frame margin signal *e* coincide with each other. The output of the AND gate 24 is amplified by the first sampling pulse amplifier 25, and the amplified output *g* is supplied to a first sampling and hold unit 26 which is later described.

There is further provided a second sampling and holding unit 27 and an output thereof *i* is supplied as a control signal to said vertical deflection device 6. The control signal functions as a DC bias voltage for displacing vertically the position of the raster of the scanner tube in order to obtain coincidence of the raster position with that of a frame. Part of the output *i* is supplied to a comparator 21. The comparator 21 generates an output *c* by comparing the saw tooth-form wave *b* with the output or the control signal *i* (for instance, $-E_1$ or $+E_2$). In more detail, if the level of the control signal is zero, the pulse width $W_1$ of the output C from the voltage comparator 21 is normal; if the level of the control signal is $-E_1$, the pulse width $W_2$ is narrower than $W_1$; and if the level of the control signal is $+E_2$, the pulse width $W_3$ is wider than $W_1$. The output *c* is supplied to a negative slope bootstrap circuit 29 through a differentiator 28, and from this circuit 29 a saw tooth-form wave output *d* is generated which falls at the time of falling of the output *c*. The output *d* is supplied to the first sampling and holding unit 26. To said second sampling and holding unit 27 are supplied the output *h* of the first sampling and holding unit 26 and the output of a second sampling pulse amplifier 30 which amplifies the vertical synchronizing pulse *a*.

Figure 7:
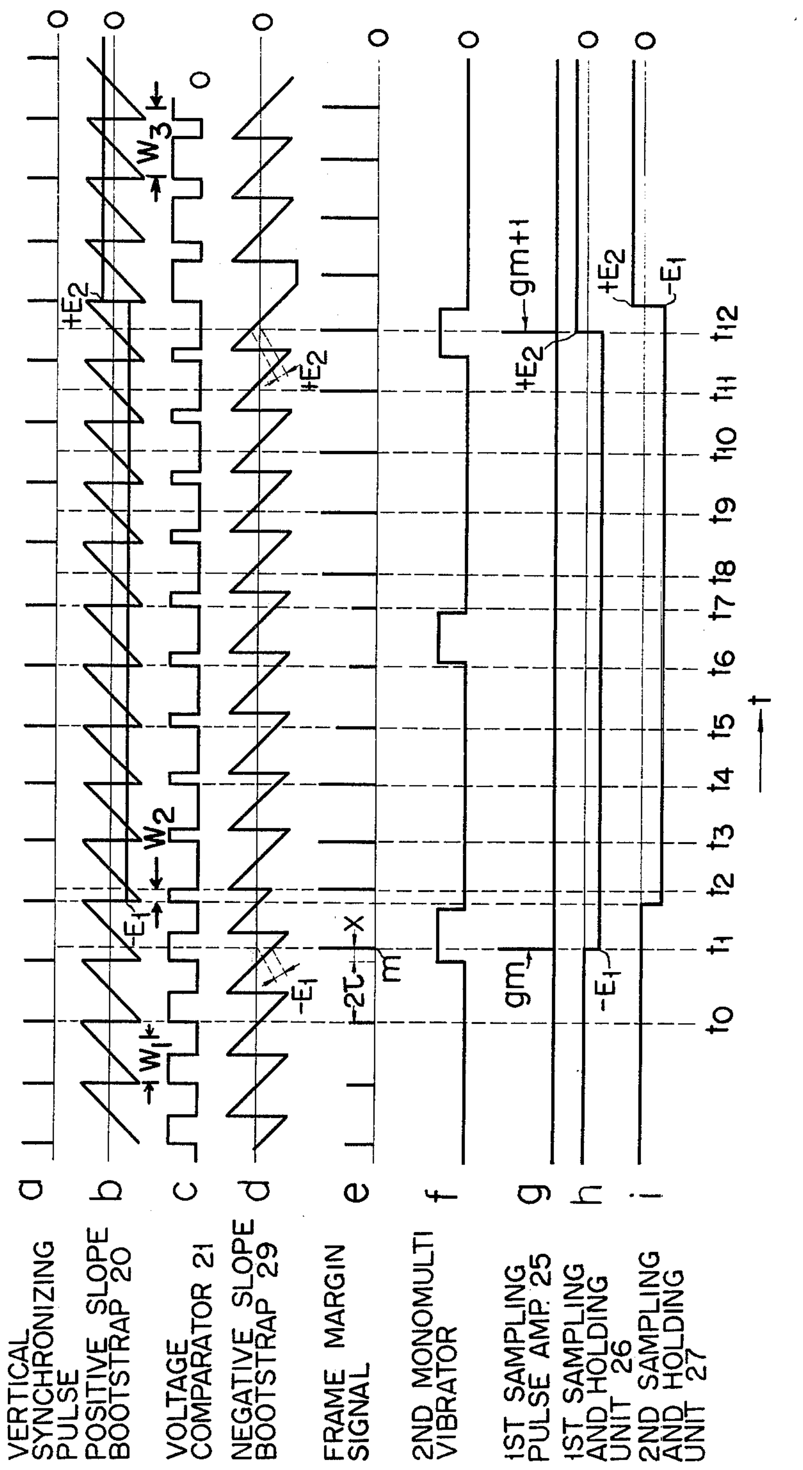
FIG. 7 is a waveform diagram for explaining the operation of FIG. 5.

Prior to a time $t_0$ indicated in FIG. 7, the phases of the vertical synchronizing pulse *a* and the frame margin signal *e* are coincident. This means that the position of the raster of the flying spot scanner tube 3 is perfectly coincident with that of a prescribed frame of the tape 1, and a still picture reproduction signal of one frame is obtained from the photomultiplier 5. At this state, the output *g* of the first sampling pulse amplifier 25, the output *h* of the first sampling and holding unit 26, and the output *i* of the second sampling and holding unit 27 are zero. The mutual relationship of each signal from *a* to *i* is in a state represented by solid lines prior to $t_0$ and the positions of the raster and the frame remain coincident.

At a time $t_1$, for instance, if the tape 1 changes its position by X in the vertical direction (referred to as the positive direction hereinafter), a frame margin signal *e* appears in the direction reverse to $t_0$ at a point m ($2\tau + X$) distant from $t_0$ (where $2\tau$ is a period of the vertical synchronizing pulse, for instance, 1/60 sec). In this case, the output *f* of the second monostable multivibrator 23 and the frame margin signal *e* are both "1", and the output gm of the first sampling pulse amplifier is supplied to the first sampling and holding unit 26. In the first sampling and holding unit 26, is sampled and held an output $h = -E_1$ corresponding to the output *d* of circuit 29 at the time $t_1$. At the time $t_1$, the output *i* of the second sampling and holding unit 27 remains zero. However, when the vertical synchronizing pulse *a* is supplied immediately after the time $t_1$ to the second sampling and holding unit 27 through the second sampling pulse amplifier 30, the unit 27 holds the first sampling and holding unit output $h = -E_1$ and supplies an output $i = -E_1$ as control signal to the vertical deflection device 6. The output state $i = -E_1$ remains unchanged until the first sampling pulse amplifier 25 generates the succeeding pulse $gm + 1$. That is to say, since the tape position changes by X, the position of the raster is corrected in the manner as described above. The above correction of the raster position is completed at a time $t_6$ when a transient response period from times $t_2$ to $t_5$ has passed, and the position of the raster is fixed. That is, the vertical synchronizing pulse *a* is coincident with the frame margin signal *e* with respect to time. It is herein to be noted that the relationship between a phase difference, for instance, X of the frame margin signal *e* (or gm) with respect to the vertical synchronizing signal *a* when the first sampling pulse amplifier generates output gm and the amplitude of the control signal $-E_1$, for instance, held constant.

Now in FIG. 7, let us consider a case wherein the tape changes its position at a time $t_8$ reversely to the aforesaid direction (referred to as the negative direction hereinafter). The output *f* of the second monostable multivibrator 23 is zero at the time $t_8$ and the first sampling pulse amplifier 25, accordingly, does not generate an output. However, at a time $t_{12}$ an amplified frame margin signal $gm + \mathbf{1}$ is supplied to the first sampling and holding unit 26. Consequently, the amplitude $+E_2$ of the saw tooth-form wave *d* at the time $t_{12}$ is supplied, as output *h* of the first sampling and holding unit 26, to the second sampling and holding unit 27; and at the time of generation of the vertical synchronizing pulse *a* immediately after the time $t_{12}$, the control signal $+E_2$ is supplied from the unit 27 to the vertical deflection device 6. The raster position is accordingly corrected so as to coincide with the frame again. In this case, a period from $t_8$ to $t_{12}$ is the control delay time before a control starts to adjust the raster position, and it is apparent in this embodiment that it does not exceed 4 times the vertical synchronizing pulse period.

It is allowable that omitting the second sampling and holding unit 27 and the second sampling pulse amplifier 30, the output *h* of the first sampling and holding unit 26 is supplied to the vertical deflection device 6 and fed back to the voltage comparator 21.

What we claim is:

1. A control device for obtaining a still picture from an apparatus in which a video film is scanned by a flying spot scanner having a vertical deflection device and the video film has a plurality of luminance signal recorded frames and frames on which color signals are recorded together which pilot signals, each frame being separated from the others by a frame margin at a prescribed pitch, and a pair of the luminance signal recorded frame and color signal recorded frame being scanned simultaneously, said control device comprising:

a frame margin signal detector for obtaining a frame margin signal corresponding to a frame margin from a picture signal produced by said scanning by detecting the lack of said pilot signal recorded on the frame margin; and a control circuit which comprises means for detecting a phase difference between the phase of a vertical synchronizing pulse of said vertical deflection device and that of the frame margin signal to produce a control signal the amplitude of which is proportional to said phase difference, and means for supplying the control signal as a DC bias voltage to said vertical deflection device so as to displace vertically the position of the raster formed by said scanning and to bring the position into coincidence with that of the pair of frames.

2. A control device for obtaining a still picture from an apparatus in which a video film is scanned by a flying spot scanner having a vertical deflection device and the video film has a plurality of frames on which picture signals are recorded, each frame being separated from the others by a frame margin at a prescribed pitch, said control device comprising:

a frame margin signal detector for obtaining a frame margin signal corresponding to a frame margin from a picture signal produced by said scanning; and a control circuit supplied with said frame margin signal for producing a control signal to control said vertical deflection device so as to displace vertically the position of the raster formed by said scanning and to bring the position into coincidence with that of a frame, said control circuit comprising: a positive slope bootstrap generating a positive slope saw tooth-form wave in synchronism with the time period when a vertical synchronizing pulse of the vertical deflection device of the flying spot scanner is supplied;

frame margin signal gating means supplied with the vertical synchronizing pulse and frame margin signal to extract one frame margin signal when the phase difference occurs between the vertical synchronizing pulse and the frame margin signal;

a comparator supplied with the positive slope saw tooth-form wave and the control signal to produce a first output pulse having a width corresponding to a level difference between the positive slope saw tooth-form wave and the control signal;

a negative slope bootstrap supplied with the first output pulse to generate a negative slope tooth wave falling in synchronism with the time period when the first output pulse falls;

sampling and holding means supplied with the saw tooth-form wave from the negative slope bootstrap and the margin signal extracted by the frame margin signal extraction means to sample and hold the voltage of the negative slope saw tooth-form wave in the time period when the extracted frame margin signal is supplied from the frame margin signal extraction means; and means for supplying the sampled and held voltage to the comparator as one of the comparing input and to the vertical deflection device as the control signal or a DC bias voltage for bringing the position of the raster into coincidence with that of a frame.

3. A control device according to claim 2 wherein the frame margin signal extraction means comprises:

a first monostable multi-vibrator supplied with the vertical synchronizing pulse to produce a second pulse which has a pulse width wider than n times but narrower than $n + 1$ times of the period of said vertical synchronizing pulse and rises in synchronism with the vertical synchronizing pulse;

a second monostable multi-vibrator supplied with the second pulse to produce a third pulse which has a pulse width narrower than one period of the vertical synchronizing pulse and rises in synchronism with the falling time period of the second pulse; and an AND gate supplied with the frame margin signal and the third pulse to emit the one frame margin signal.

4. A control device according to claim 2 wherein the sampling and holding means comprises a first sampling and holding unit coupled to the negative slope bootstrap and to the frame margin signal extraction means for sampling and holding the voltage of the negative slope saw tooth-form wave in the time period when the extracted frame margin signal is supplied from the frame margin signal extraction means to produce a control voltage; and a second sampling and holding unit supplied with the control voltage and the vertical synchronizing pulse for sampling and holding the control voltage and giving the control voltage as the control signal from the time when the vertical synchronizing pulse is generated immediately after the extracted frame margin signal is generated.

5. A control device according to claim 2 wherein the video film has a plurality of luminance signal recorded frames and frames on which color signals are recorded together with pilot signals, and the frame margin signal detector detects the frame margin signal corresponding to a frame margin from the picture signal by detecting the lack of the pilot signal recorded on the frame margin.

* * * * *